(12) United States Patent
Tsai et al.

(10) Patent No.: US 9,652,012 B2
(45) Date of Patent: May 16, 2017

(54) ELECTRONIC DEVICE AND POWER SUPPLYING METHOD THEREOF

(71) Applicant: ASUSTeK COMPUTER INC., Taipei (TW)

(72) Inventors: Ming-Ting Tsai, Taipei (TW); Ching-Han Li, Taipei (TW); Hsiang-Jui Hung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 107 days.

(21) Appl. No.: 14/684,420

(22) Filed: Apr. 12, 2015

(65) Prior Publication Data

US 2016/0004285 A1    Jan. 7, 2016

(30) Foreign Application Priority Data

Jul. 1, 2014  (TW) .............. 103122680 A

(51) Int. Cl.
 *G06F 1/30* (2006.01)
 *G06F 1/26* (2006.01)
 *G06F 1/28* (2006.01)

(52) U.S. Cl.
 CPC ............... *G06F 1/305* (2013.01); *G06F 1/26* (2013.01); *G06F 1/28* (2013.01)

(58) Field of Classification Search
 CPC ............... G06F 1/305; G06F 1/28; G06F 1/26
 See application file for complete search history.

(56) References Cited

U.S. PATENT DOCUMENTS

| 8,659,277 | B2 | 2/2014 | Chen |
| 8,779,747 | B2 | 7/2014 | Su et al. |
| 8,850,233 | B2 | 9/2014 | Su et al. |
| 2002/0070726 | A1 | 6/2002 | Sugamori |
| 2010/0191986 | A1 | 7/2010 | Su et al. |
| 2012/0286754 | A1 | 11/2012 | Chen |
| 2013/0107584 | A1 | 5/2013 | Li et al. |
| 2013/0162226 | A1 | 6/2013 | Su et al. |

FOREIGN PATENT DOCUMENTS

| CN | 102570546 | 7/2012 |
| TW | 201015824 | 4/2010 |
| TW | 201028834 | 8/2010 |
| TW | 201245920 | 11/2012 |
| TW | 201320564 | 5/2013 |
| TW | 201327083 | 7/2013 |

*Primary Examiner* — Stefan Stoynov
(74) *Attorney, Agent, or Firm* — Jianq Chyun IP Office

(57) ABSTRACT

An electronic device and a power supplying method thereof are provided. An electronic device includes a host and a power supply. The host receives a power via a power supply path. The power is transmitted to the host via the power supply path. The power supply detects state changes of a plurality of supply current values at the power supply path obtained by the host from the power supply at a plurality of time intervals, so as to generate a determining result. A voltage value of the power is changed according to the determining result.

12 Claims, 5 Drawing Sheets

ELECTRONIC DEVICE AND POWER SUPPLYING METHOD THEREOF

CROSS-REFERENCE TO RELATED APPLICATION

This application claims the priority benefit of Taiwan application serial no. 103122680, filed on Jul. 1, 2014. The entirety of the above-mentioned patent application is hereby incorporated by reference herein and made a part of this specification.

BACKGROUND OF THE INVENTION

Field of the Invention

The invention relates to an electronic device and a power supplying method thereof and, more particularly, to a charging method of an electronic device.

Description of the Related Art

As electronic technology develops, electronic products are necessary in daily life. Conventionally, the electronic products usually charged by a signal transmission interface for portability requirement, such as a universal serial bus (USB) interface.

Please refer to FIG. 1, FIG. 1 is a schematic diagram showing that a conventional electronic device is charged. A portable electronic device 110 is connected to a connection interface CN2 of a USB charger 120 via a connection interface CN1, and it receives power transmitted by a pin VBUS2 of the USB charger 120. Via a connection between the connection interfaces CN1 and CN2, a pin VBUS1 is electrically connected to the pin VBUS2, a pin D1− is electrically connected to a pin D2−, and a pin D1+ is electrically connected to a pin D2, and both the connection interfaces CN1 and CN2 are connected to a reference ground terminal GND. In FIG. 1, the portable electronic device 110 can determine a maximum electric power provided from the USB charger 120 by detecting a voltage between the pins D1− and D1. The relationship between the resistance across the pins D2− and D2+ of the USB charger 120 and the maximum provided electric power are predefined (for example, when the pins D2− and D2+ are short-circuited, the maximum electric power of 1.5 A can be provided).

As stated above, the portable electronic device 110 can determine whether to be charged by detecting the maximum electric power provided by the USB charger 120. However, when the portable electronic device 110 has a new charging specification, additional hardware is needed (for example, an integrated circuit for identifying is additionally disposed at the end of the portable electronic device 110 and the end of USB charger 120, respectively), which increases the cost.

BRIEF SUMMARY OF THE INVENTION

An electronic device and a power supplying method thereof are provided to dynamically adjust a voltage value to a host.

An electronic device includes a host and a power supply. The host receives a power via a power supply path. The power is transmitted to the host via the power supply path. The power supply detects a state of a plurality of supply current values at the power supply path obtained by the host from the power supply at a plurality of time intervals, so as to generate a determining result. A voltage value of the power is changed according to the determining result.

A power supplying method of an electronic device includes: providing a power to a host via a power supply path; detecting a state of a plurality of supply current values at the power supply path obtained by the host from the power supply at a plurality of time intervals, and generating a determining result; and changing a voltage value of the power according to the determining result.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
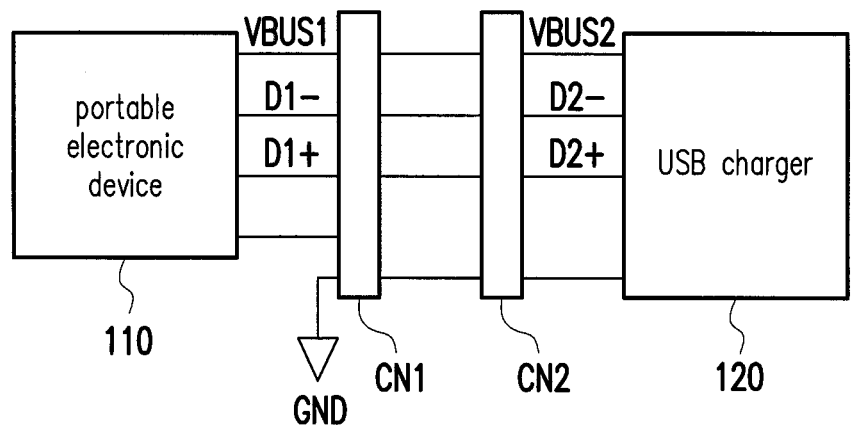
FIG. 1 is a schematic diagram showing that a conventional electronic device is charged.
Figure 2:
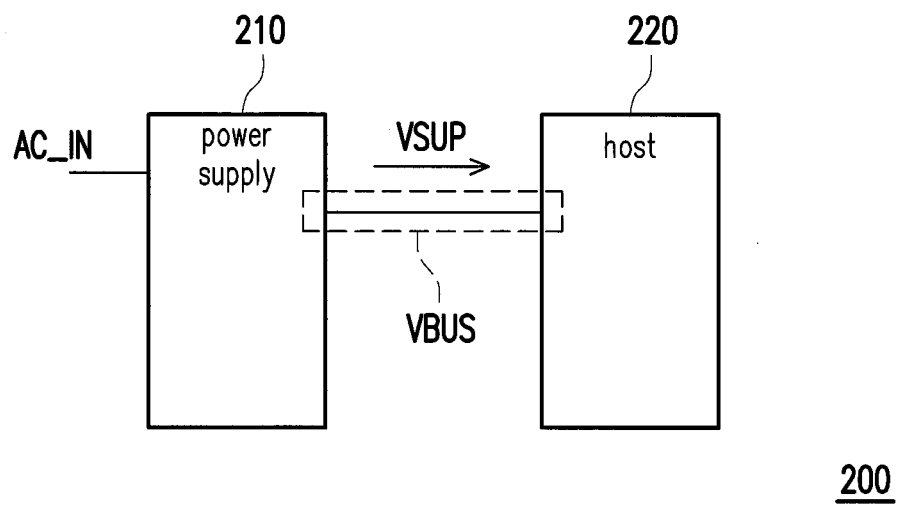
FIG. 2 is a schematic diagram showing an electronic device in an embodiment.

Please refer to FIG. 2, FIG. 2 is a schematic diagram showing an electronic device 200 in an embodiment. The electronic device 200 includes a power supply 210 and a host 220. The power supply 210 is coupled to the host 220 via a power supply path VBUS, and it provides a power VSUP to the host 220. In an embodiment, the power supply path VBUS is formed by connecting the USB interface of the power supply 210 and the USB interface of the host 220, respectively. The host 220 may be an electronic product, such as a mobile device (a tablet or a smart phone), which is not limited herein. In addition, the power supply 210 may be an AC-DC power converter, and it receives an input power AC_IN and converts the input power AC_In to a DC power to be used as the power VSUP.

When the power supply 210 provides the power VSUP to the host 220 via the power supply path VBUS, a supply current can charge power storage elements (such as a battery) of the host 220. Further, when the host 220 requires the power supply 210 to provide the power VSUP of different specifications to charge, the host 220 can change the value of a supply current obtained from the power supply path VBUS at a plurality of time intervals, respectively, so as to inform the power supply 210 to change the specification of the power VSUP.

Correspondingly, the power supply 210 detects a state of multiple supply current values obtained by the host 220 from the power supply 210 at the plurality of time intervals, so as to generate a determining result of the supply current value. The power supply 210 can change the specification of the power VSUP according to the determining result, such as a voltage value of the power VSUP.

Figure 3A:
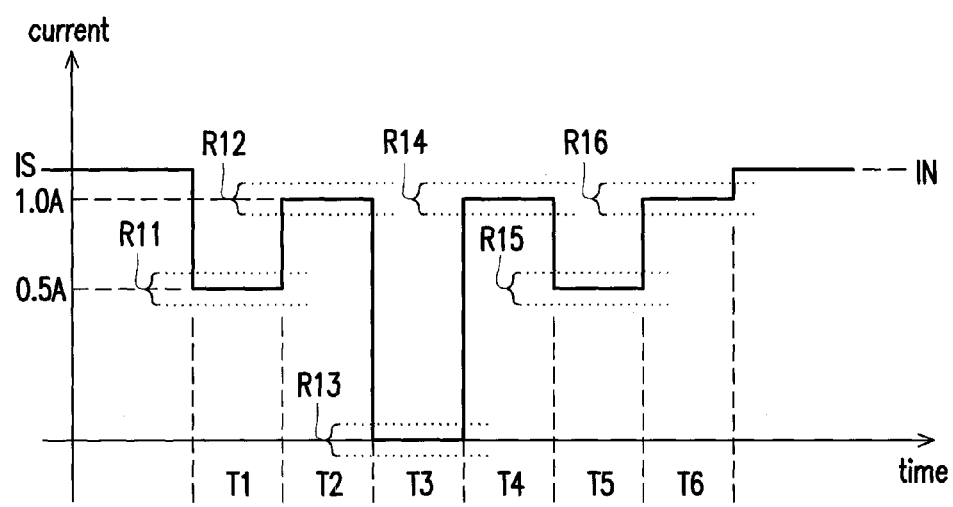
FIG. 3A and FIG. 3B are schematic diagrams showing current waveforms of supply currents in different embodiments.
Figure 3B:
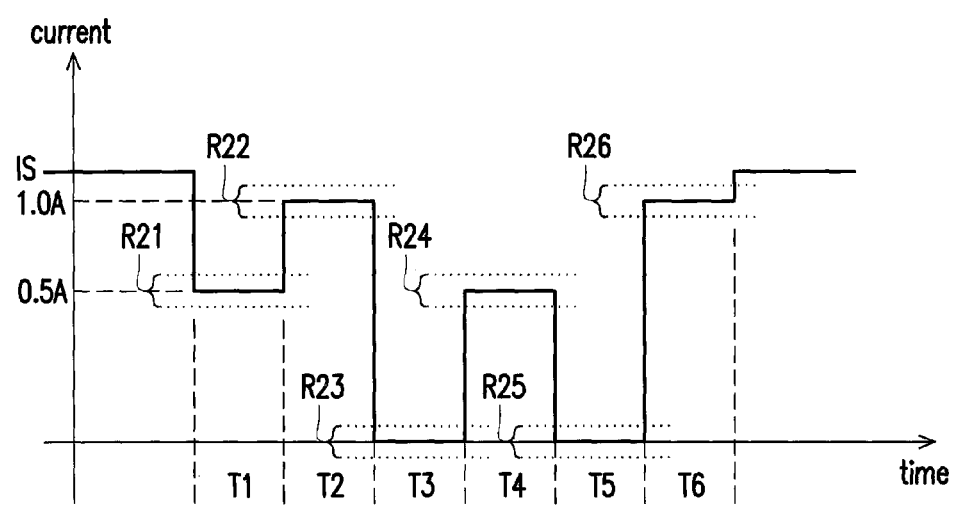

Please refer to FIG. 2, FIG. 3A and FIG. 3B, FIG. 3A and FIG. 3B are schematic diagrams showing current waveforms of supply currents in different embodiments. In FIG. 3A, the power supply 21 can detect a supply current IS, and it obtains the determining result by determining whether the supply current IS is within predetermined current ranges R11 to R16 at time intervals T1 to T6, respectively, to obtain the determining result. In FIG. 3A, the power supply 210 determines that the supply current IS is within the predetermined current ranges R11 to R16 at the time intervals T1 to T6, respectively, and the host 220 informs the power supply 210 that the voltage value of the power VSUP needs to be adjusted. The power supply 210 adjusts the voltage value of the power VSUP from a first voltage value to a second voltage value. The second voltage value may be higher than the first voltage value, that means, the power supply 210 can execute a voltage jump to the power VSUP.

To prevent the misoperation, at least two different current ranges of the predetermined current ranges R11 to R16 are set, and the predetermined current ranges R11 to R16 may a combination of two or more different current ranges. In FIG. 3A, the predetermined current ranges R11, R15 are the same, and the current ranges R12, R14 and R16 are the same. The predetermined current ranges R11 to R16 can be preset, and related information is stored in the host 220 and the power supply 210. The predetermined current range R16 corresponding to the last time period T6 is set to close to a current range of a normal current IN of the supply current IS.

In addition, with the considerate of the stability of the supply current IS, the time intervals T1 to T6 do not need to be continuous. For example, an appropriate interval may be between the time intervals T1 and T2.

In FIG. 3B, the power supply 210 determines that the supply current IS is within the predetermined current ranges R21 to R26 at the time intervals T1 to T6, respectively, and the host 220 informs the power supply 210 to adjust the voltage value of the power VSUP. The predetermined current ranges R21 to R23, R26 corresponding to the time intervals T1 to T3, T6 in FIG. 3B are the same with the predetermined current ranges R11 to R13, R16 in FIG. 3A. The predetermined current ranges R24 to R25 corresponding to the time intervals T4 to T5 in FIG. 3B are different from the predetermined current ranges R14 to R15 in FIG. 3A. Moreover, the power supply 210 adjusts the voltage value of the power VSUP from the first voltage value to a third voltage value according to the supply current IS in FIG. 3B. The third voltage value is higher than the second voltage value, that means, the power supply 210 can execute a voltage jump on power VSUP with different voltage values.

In the embodiment, the first time intervals T1 to T3 can be set to be information of informing the power supply 210 whether or not to adjust the power VSUP, the second time intervals T4 to T6 can be set to be information of informing the power supply 210 the voltage value of the power VSUP to be adjusted. That means, the power supply 210 can compare the supply current IS at the first time intervals T1 to T3 to the predetermined current ranges R11 to R13 (R21 to R23), respectively, and then the host 220 informs the power supply 210 to adjust the power VSUP. Further, the power supply 210 can compare the supply current IS at the second time intervals T4 to T6 to the predetermined current ranges R14 to R16 and R24 to R26, respectively, and the power supply 210 can get the voltage value of the power VSUP to be adjusted.

As stated above, a plurality of predetermined current range groups can be set in the host 220 and the power supply 210 which are corresponding to the multiple voltage values of the power VSUP to be adjusted. In the embodiment, two predetermined current range groups are set in the host 220 and the power supply 210, it includes a predetermined current range of the predetermined current range group R11 to R16 corresponding to the voltage value of 9V of the power VSUP, it also includes a predetermined current range of the predetermined current range group R21 to R26 corresponding to the voltage value of 12V of the power VSUP, and the default voltage value of the power VSUP is 5V.

The number of the predetermined current range groups can be set according to requirements, which is not limited herein. The number of the predetermined current ranges and the time intervals corresponding to the predetermined current ranges which are included in each of the predetermined current range group are not limited. In addition, the length of each of the time interval is not limited, and each of the time interval may be not less than 10 ms.

The power supply 210 can charge a battery of the host 220 quickly to achieve quick charging by increasing the voltage value of the power VSUP.

Figure 4A:
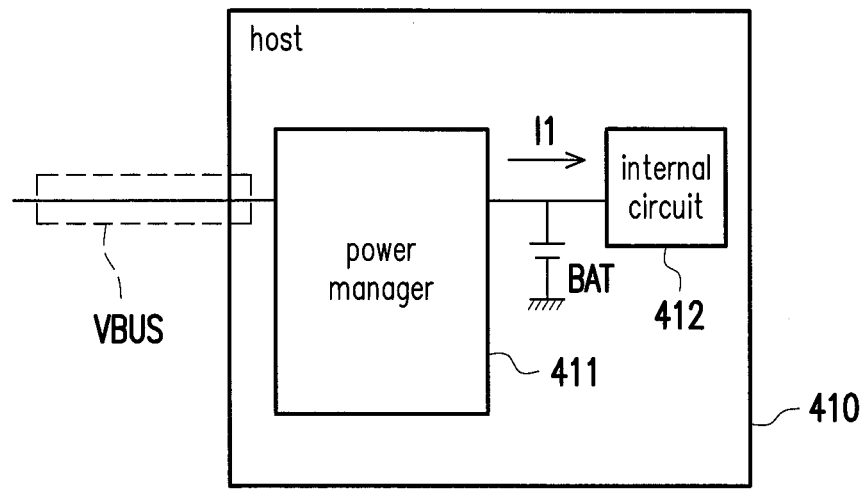
FIG. 4A is a schematic diagram showing a host in an embodiment.

Please refer to FIG. 4A, FIG. 4A is a schematic diagram showing a host in an embodiment. The host 410 includes a power manager 411, an internal circuit 412 and a battery BAT. The power manager 411 is coupled to the power supply and receives the power via the power supply path VBUS. The power manager 411 charges the battery BAT.

In addition, if the host 410 needs to adjust the voltage value of the power VSUP transmitted by the power supply, the power manager 411 can execute a current limiting operation to the power supply path VBUS at the plurality of time intervals according to a required current generated by the internal circuit 412, so as to generate the corresponding supply current value. The value of the required current I1 is higher than each of the supply current values. In detail, if the required current I1 generated by the internal circuit 412 is 1.2 A, and the power manager 411 does not execute the current limiting operation, the power supply path VBUS can provides the supply current of 1.2 A to the host 410. If the current limiting operation is executed via the power manager 411, the power manager 411 can make the value of the supply current provided by the power supply path VBUS less than 1.2 A. Please refer to FIG. 3A and FIG. 4A, the power manager 411 can execute the current limiting operation at the time interval T1 and make the supply current value provided by the power supply path VBUS approximately equal to 1.0 A. At the time interval T2, the current limiting operation is executed and the supply current value provided by the power supply path VBUS approximately equals to 0.5 A. Thus, the power manager 411 can change the supply current value provided by the power supply path VBUS at each of the time intervals, and then the power supply is informed to adjust the power VSUP.

Figure 4B:
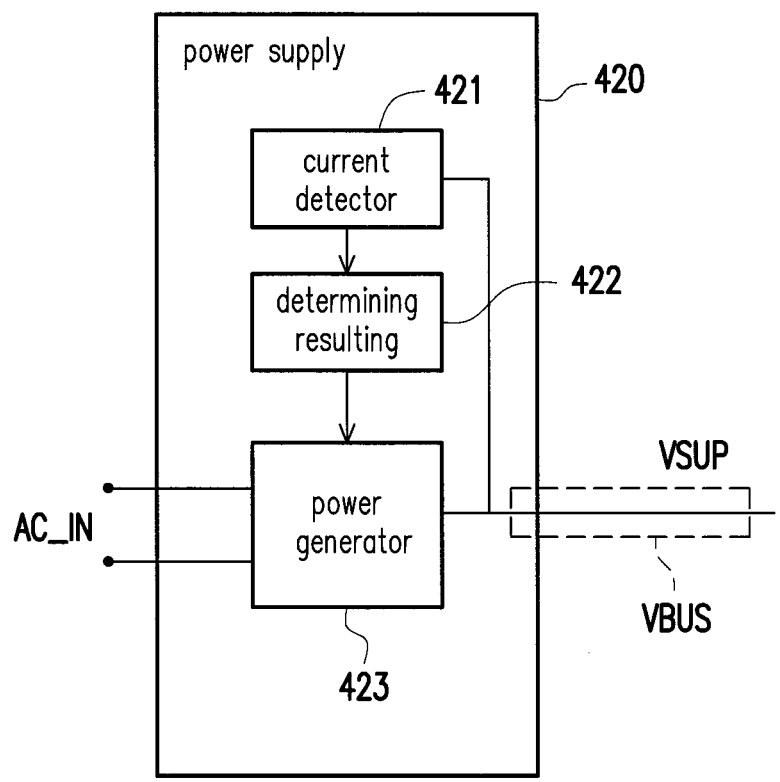
FIG. 4B is a schematic diagram showing a power supply in an embodiment.

Please refer to FIG. 4B, FIG. 4B is a schematic diagram showing a power supply 420 in an embodiment. The power supply 420 receives an input power AC_IN and generates the power VSUP. The power supply 420 includes a current detector 421, a determining circuit 422 and a power generator 423. The current detector 421 is coupled to the power supply path VBUS and detects the supply current value at the power supply path VBUS. One end of the determining circuit 422 is coupled to the current detector 421, and it determines the change of the state of the supply current value at the power supply path VBUS detected by the current detector 421, so as to generate the determining result. The flow of determination of the determining circuit 422 is already described in the embodiments in FIG. 2, FIG. 3A and FIG. 3B, which is omitted herein.

The other end of the determining circuit 422 is coupled to the power generator 423 and provides the determining result to the power generator 423. The power generator 423 executes a voltage conversion to the input power AC_IN according to the determining result, so as to adjust the voltage value of the power VSUP.

Figure 5:
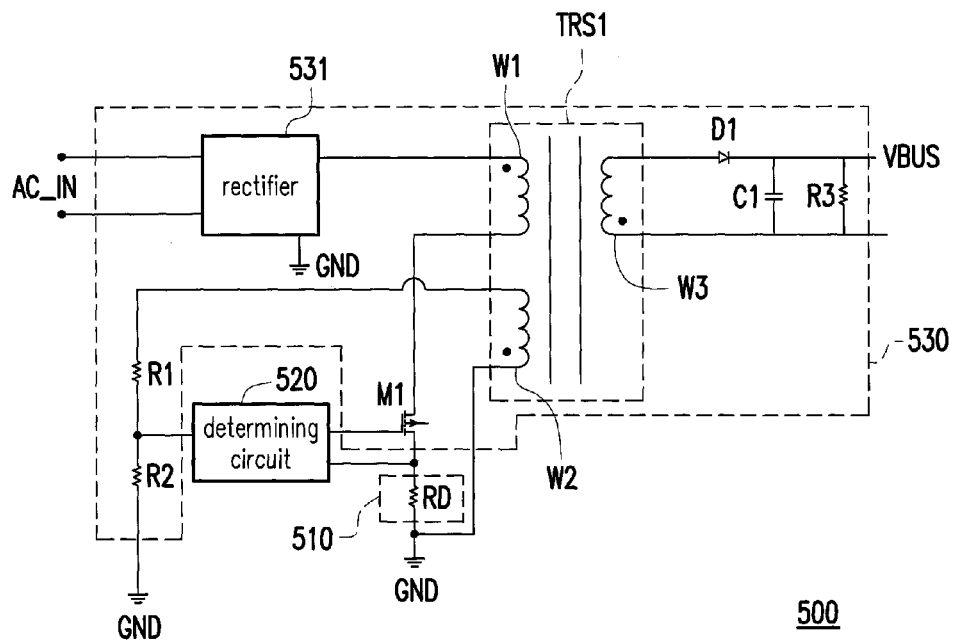
FIG. 5 is a schematic diagram showing a voltage supply in an embodiment.

FIG. 5 is a schematic diagram showing a voltage supply in an embodiment. A power supply 500 includes a current detector 510, a determining circuit 520 and a power generator 530. The power generator 530 includes a rectifier 531, a divider formed by resistors R1, R2, a transformer TRS1, a power transistor M1, a diode D1, a rectifying circuit formed by a capacitor C1 and a resistor R3. The rectifier 531 receives and rectifies the input power AC_IN, and a result of the rectification is transmitted to one end of a winding W1 at a primary side of the transformer TRS1. The other end of the winding W1 is coupled to the source of the power transistor M1, and the drain of the power transistor M1 is coupled to the current detector 510. In addition, the gate of the power transistor M1 is coupled to the determining circuit 520. The primary side of the transformer TRS1 further includes a winding W2. One end of the winding W2 is coupled to the resistor R1, the other end of the winding W2 is coupled to the reference ground terminal GND. The winding W3 at a secondary side of transformer TRS1 is coupled to the rectifying circuit formed by the diode D1, the capacitor C1 and the resistor R3, and the rectifying circuit is coupled to the power supply path VBUS.

The determining circuit 520 is coupled to the current detector 510 and the divider formed by the resistor R1, R2. The determining circuit 520 generates a signal to control the power transistor M1 to turn on or turn off according to the current flowing through the power transistor M1 and the voltage value detected between the resistors R1, R2, the current is detected by the current detector 510. The current detector 510 is a resistor RD connected between the drain of the power transistor M1 and a reference ground terminal GND in series.

In detail, the determining circuit 520 can get the state of the supply current at the power supply path VBUS at the different time intervals via the current detected by the current detector 510, and it controls the power transistor M1 to adjust the voltage value of the power via the detected voltage value between the resistors R1, R2. The signal provided by the determining circuit 520 to the gate of the power transistor M1 may be a pulse width modulation (PWM) signal. The determining circuit 520 and the current detector 510 are disposed at the primary side of the transformer TRS1, which would not affect the quality of the power generated at secondary side of the transformer.

Figure 6:
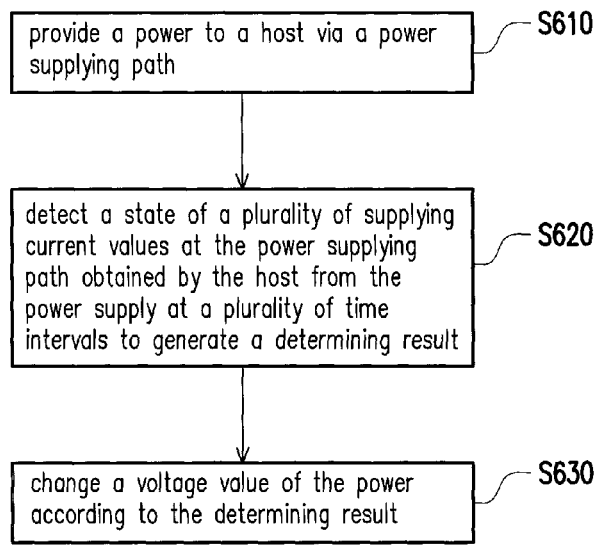
FIG. 6 is a flow chart showing a power supplying method of an electronic device in an embodiment.

Please refer to FIG. 6, FIG. 6 is a flow chart showing a power supplying method of an electronic device in an embodiment. In step S610, the power supply provides power to the host through the power supply path. In step S620, the power supply detects the state of a plurality of supply current values at the power supply path obtained by the host from the power supply at a plurality of time intervals, so as to generate a determining result. In step S630, the power supply changes the voltage value of the power according to the determining result.

Figure 7:
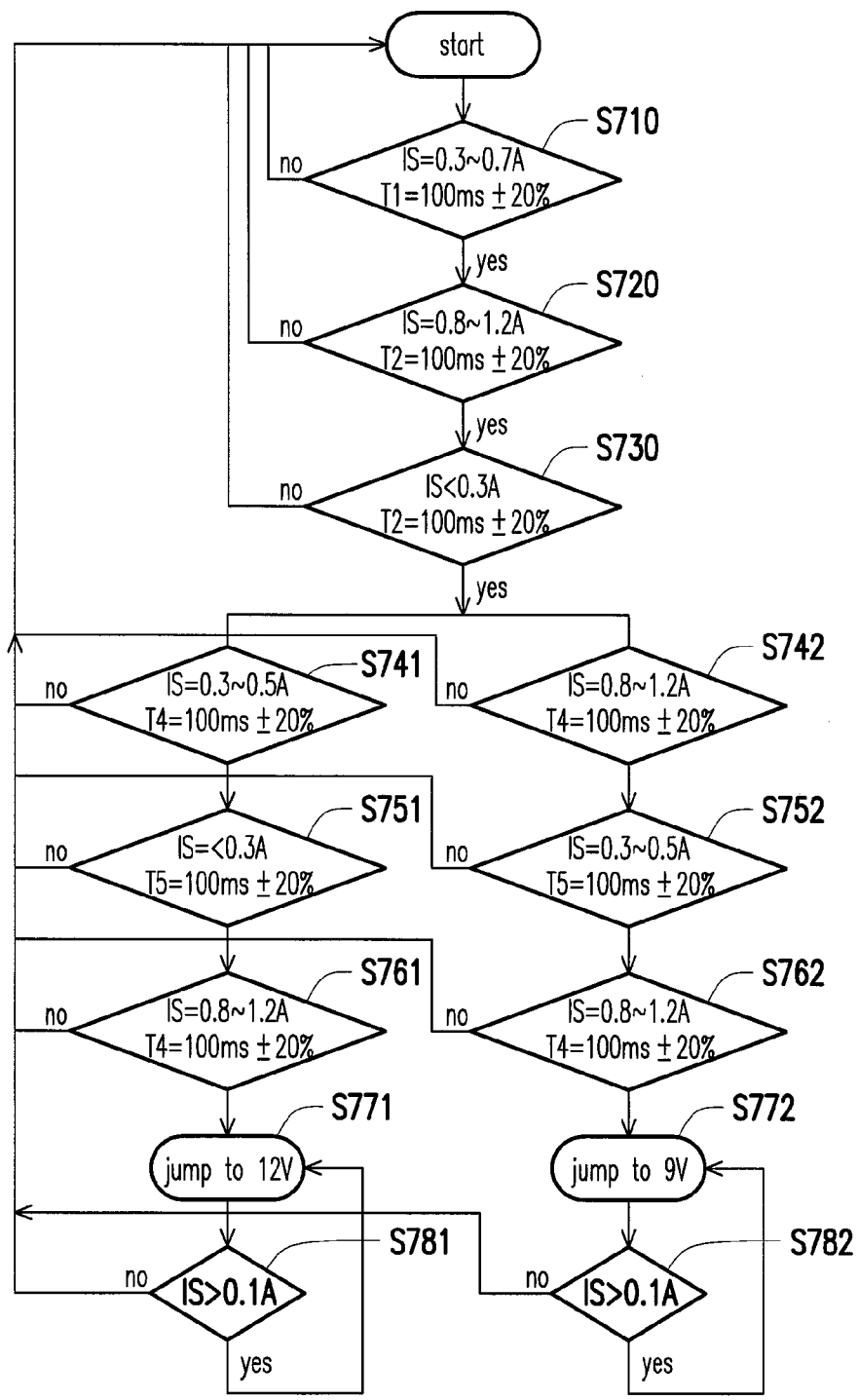
FIG. 7 is a flow chart showing details of a power supplying method of an electronic device in an embodiment.

The detail of steps can refer to the above embodiments or an embodiment in FIG. 7.

Please refer to FIG. 7, FIG. 7 is a flow chart showing details of a power supplying method of an electronic device in an embodiment. In an initial state, the voltage value of the power is 5V, the supply current IS is higher than 0.3 A. In step S710, whether the supply current IS is maintained at the predetermined current range 0.3 to 0.7 A at the time interval T1 is detected, the length of the time interval T1 is 100 ms+−20%. In step S720, whether the supply current IS is maintained at the predetermined current range 0.8 to 1.2 A at the time interval T2 is detected, and the time interval T2 is 100 ms+−20%. In step S730, whether the supply current IS is maintained at the predetermined current range 0 to 0.3 A at the time interval T3 is detected, the time interval T3 is 100 ms+−20%.

Further, in step S741, whether the supply current IS is maintained at the predetermined current range 0.3 to 0.5 A at the time interval T4 is detected, in step S742, whether the supply current IS is maintained at the predetermined current range 0.8 to 1.2 A at the time interval T4 is detected, and the time interval T4 is 100 ms+−20%. If both the detecting results at step S741 and step S742 are "No", go back to the start step. If the detecting result of step S741 is "Yes", step S751 is executed, if the detecting result at step S742 is "Yes", step S752 is executed.

In steps S751 and S752, whether the supply current IS is maintained at the predetermined current range 0 to 0.3 A and 0.3 to 0.5 A at the time interval T5 is detected, and the time interval T5 is 100 ms+−20%. If one of the detecting results at step S751 and step S752 is "No", go back to the start step. If the detecting result at step S751 is "Yes", step S761 is executed, if the detecting result at step S752 is "Yes", step S762 is executed.

In steps S761 and S762, whether that the supply current IS is maintained at the predetermined current range 0.8 to 1.2 A at the time interval T6 is detected, the time interval T6 is 100 ms+−20%. If one of the detecting results of at step S761 and step S762 is "No", go back to the start step. If the detecting result of step S761 is "Yes", step S771 is executed, if the detecting result of step S762 is "Yes", step S772 is executed.

Both at step S771 and step S772, the voltage jump to the power is executed. In step S771, the voltage value of the power is changed to 12V, in step S772, the voltage value of the power is changed to 9V.

A standard output voltage of the USB is 5V, and when different hosts are connected to the power supply, the host which does not support high voltage charging may be burn out. Once the port is pulled out, or the current is less than a certain degree (the quick charging is not necessary at the moment), the output voltage is reduced to 5V to ensure the safety. Thus, after the voltage value of the power is changed to 12V or 9V, the power supply can further detects the supply current at the power supply path, when the supply current is not larger than the predetermined threshold current value (such as 0.1 A), the power supply can adjust the voltage value of the power to the initial voltage value of 5V (in steps S781 and S782).

In sum, the host obtains a plurality of supply current values from the power supply at the plurality of time intervals, so as to change the supply current value at the power supply path, the power supply detects the state of the supply current value at the plurality of time intervals to get how to adjust the voltage value of the power. Thus, without additional hardware, the power supply can automatically adjust to provide the power of different voltage values to the host, so as to meet the requirement that the host needs the power of different voltage values. That means, the adjustment of the power of the electronic device is increased to enhance the effectiveness of the system without increasing the cost.

Although the invention has been disclosed with reference to certain preferred embodiments thereof, the disclosure is not for limiting the scope. Persons having ordinary skill in the art may make various modifications and changes without departing from the spirit and the scope of the invention.

Therefore, the scope of the appended claims should not be limited to the description of the preferred embodiments described above.

What is claimed is:

1. An electronic device, comprising:
   a host, wherein the host receives a power via a power supply path; and
   a power supply, wherein the power is transmitted to the host via the power supply path, the power supply detects a state of a plurality of supply current values at the power supply path obtained by the host from the power supply at a plurality of time intervals, so as to generate a determining result, and a voltage value of the power is adjusted according to the determining result, wherein the time intervals include a plurality of first time intervals and a plurality of second time intervals, the power supply determines whether to adjust the power according to a plurality of first supply current values corresponding to the first time intervals, and the power supply determines a voltage value of the power supply according to a plurality of second supply current values corresponding to the second time intervals.

2. The electronic device according to claim 1, wherein the power supply receives a plurality of predetermined current range groups, the predetermined current range groups are corresponding to a plurality of adjusting voltage values, respectively, each of the predetermined current range groups includes a plurality of predetermined current range corresponding to the time intervals, the power supply compares the supply current values to the predetermined current range of each of the predetermined current range groups, so as to select one of the adjusting voltage values to adjust a voltage value of the power.

3. The electronic device according to claim 1, wherein the host includes:
   a power manager coupled to the power supply path, wherein the power manager executes a current limiting operation to the power supply path to generate the supply current values according to a required current at the time intervals.

4. The electronic device according to claim 1, wherein the power supply includes:
   a current detector coupled to the power supply path and detecting a current value at the power supply path;
   a determining circuit determining a state of the supply current values at the time intervals to generate the determining result; and
   a power generator coupled to the determining circuit and changing the voltage value of the power according to the determining result.

5. The electronic device according to claim 1, wherein the host provides the power supply path via a universal serial bus (USB) interface.

6. The electronic device method according to claim 1, wherein the power supply adjusts the voltage value of the power from a first voltage value to a second voltage value according to the determining result, and the second voltage value is higher than the first voltage value.

7. The electronic device according to claim 6, wherein after the voltage value of the power is adjusted to the second voltage value, the voltage value of the power is adjusted to the first voltage value if the power supply detects that a current at the power supply path is not larger than a predetermined threshold current value.

8. A power supplying method of an electronic device, comprising:
   providing a power to a host via a power supply path;
   detecting a state of a plurality of supply current values at the power supply path obtained by the host from a power supply at a plurality of time intervals, and generating a determining result, wherein the time intervals includes a plurality of first time intervals and a plurality of second time intervals, and the step of detecting the state of the supply current values at the power supply path obtained by the host from the power supply at the time intervals includes:
      determining whether to adjust the power according to a plurality of supply current values corresponding to the first time intervals, and determining a voltage value of the power to be adjusted according to a plurality of second supply current values corresponding to the second time intervals; and
   changing a voltage value of the power according to the determining result.

9. The power supplying method according to claim 8, wherein the step of detecting the state of the supply current values at the power supply path obtained by the host from the power supply at the time intervals includes:
   receiving a plurality of predetermined current range groups, wherein the predetermined current range groups are corresponding to a plurality of adjusting voltage values, respectively, each of the predetermined current range groups includes a plurality of predetermined current ranges corresponding to the time intervals, and
   comparing the supply current values to the predetermined current range of each of the predetermined current range groups, so as to select one of the adjusting voltage values to adjust a voltage value of the power.

10. The power supplying method according to claim 8, further comprising:
    executing a current limiting operation to the power supply path to generate the supply current values at the time intervals according to a required current.

11. The power supplying method according to claim 8, wherein the step of changing the voltage value of the power according to the determining result includes:
    adjusting the voltage value of the power from a first voltage value to a second voltage value according to the determining result, wherein the second voltage value is higher than the first voltage value.

12. The power supplying method according to claim 11, wherein after the step of adjusting the voltage value of the power from the first voltage value to the second voltage value, the power supplying method further includes:
    adjusting the voltage value of the power to the first voltage value when detecting a supply current at the power supply path is not larger than a predetermined threshold current value.

* * * * *